United States Patent
Ayachitula et al.

(10) Patent No.: US 7,472,144 B2
(45) Date of Patent: Dec. 30, 2008

(54) METHOD AND SYSTEM FOR RESOLVING MEMORY LEAKS AND RELEASING OBSOLETE RESOURCES FROM USER SESSION DATA

(75) Inventors: Naga A. Ayachitula, Elmsford, NY (US); JoAnn Piersa Brereton, Hawthorne, NY (US); Shu-Ping Chang, Shrub Oak, NY (US); Michael Stephen Schwartz, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/628,738

(22) Filed: Jul. 28, 2003

(65) Prior Publication Data

US 2005/0028140 A1 Feb. 3, 2005

(51) Int. Cl.
G06F 17/30 (2006.01)
(52) U.S. Cl. ............ 707/206; 707/9; 707/10; 707/200; 707/205
(58) Field of Classification Search ......... 707/202–205, 707/9–10; 709/226
See application file for complete search history.

(56) References Cited

U.S. PATENT DOCUMENTS

| | | | |
|---|---|---|---|
| 5,793,979 A * | 8/1998 | Lichtman et al. ............ 709/226 |
| 5,832,529 A | 11/1998 | Wollrath et al. |
| 6,016,500 A * | 1/2000 | Waldo et al. ................ 707/202 |
| 6,125,434 A * | 9/2000 | Willard et al. ............... 711/170 |
| 6,327,596 B1 | 12/2001 | Wollrath et al. |
| 6,629,113 B1 * | 9/2003 | Lawrence ................... 707/206 |
| 6,675,379 B1 * | 1/2004 | Kolodner et al. ............ 717/155 |
| 6,704,743 B1 * | 3/2004 | Martin .................... 707/103 R |
| 2002/0120640 A1 | 8/2002 | Hills |

OTHER PUBLICATIONS

Willard et al., "Autonomous Garbage Collection: Removing Memory Leaks in Long Running Network Applications", IEEE, 1998, pp. 886-896.*
Gupta, et al., "Reliable Garbage Collection in Distributed Object Oriented Systems", IEEE, 1998, pp. 324-328.*
"Large Scale Information Retrieval Systems: Resolving Memory Leaks in Non-Cooperative Server Applications", Brian A. Williard, Ph.D. charts from thesis defense dated Feb. 16, 1998, Florida Institute of Technology, pp. 1-62.*
"Large Scale Information Retrieval Systems: Resolving Memory Leaks in Non-Cooperative Server Applications", Brian Willard and Ophir Frieder, Jan. 6, 1998, pp. 1-36.*
US 6,081,813, 06/2000, Wollrath et al. (withdrawn)

* cited by examiner

*Primary Examiner*—Wilson Lee
*Assistant Examiner*—Sheree N Brown
(74) *Attorney, Agent, or Firm*—Tucker Ellis & West LLP

(57) ABSTRACT

A software program (12) is configured to initiate, process, and terminate user sessions (22, 26). A resource deallocation module (50) is linked to the software program (12) to deallocate allocated external resources of each object of a user session responsive to an impending termination of said user session. An automatic memory management module (40) is invoked by the software program with respect to said user session subsequent to the deallocation performed by the resource deallocation module (50) and prior to the termination of said user session.

37 Claims, 1 Drawing Sheet

METHOD AND SYSTEM FOR RESOLVING MEMORY LEAKS AND RELEASING OBSOLETE RESOURCES FROM USER SESSION DATA

BACKGROUND OF THE INVENTION

1. Field of the Invention

The present invention relates to the art of information processing. It finds particular application in Java programming for resolving memory leaks due to failures of the automatic memory management system, and will be described with particular reference thereto. However, the present invention is useful in many other programming environments that employ automatic memory management, such as the C# programming environment.

2. Description of Related Art

A feature of Java, C#, and certain other programming environments is automatic memory management, in which one or more garbage collector algorithms are provided to automatically remove objects that are no longer in use. Programming environments with automatic memory management are less susceptible to memory leaks introduced by failure of programmers to remove unneeded objects in a timely manner.

Even with automatic memory management, however, memory leaks can arise due to various failures of the automatic memory management. In one common situation, a programmer fails to properly dereference one or more system resource references, such as file handles, database connections, sockets, threads, or the like. This leads to objects containing obsolete references that inhibit or prevent their removal by the garbage collector. Moreover, in addition to not collecting the object containing the obsolete references, the garbage collector will be inhibited or prevented from collecting any objects referenced by the object containing these obsolete references. In this way, a few obsolete references can lead to a large number of uncollected objects.

Memory leakage is a general problem that can affect any type of computer program; however, memory leaks are particularly problematic in certain programming applications where such leaks can accumulate over time to reduce the available free memory. For example, in a server application, a separate user session is opened for each user who accesses the server. The user session expires when the user logs out, closes the browser, or otherwise disengages from the server. When the session expires, the user session objects should be collected by the garbage collector to free up memory. Objects containing obsolete references may not be collected, however, and can accumulate over time as users successively log onto and disconnect from the server. Eventually, such accumulated memory leaks lead to a server crash as the available memory becomes filled.

The present invention contemplates an improved method and apparatus which overcomes these limitations and others.

SUMMARY OF THE INVENTION

In accordance with one aspect of the invention, a method of releasing resources of a user session is provided. The user session operates in a software environment that includes an automatic memory management algorithm. An impending execution of the automatic memory management algorithm is detected. Responsive to the detecting, an object of the user session is accessed. One or more external resource references of said object are identified. Said one or more external resource references are released. The accessing, identifying, and releasing are repeated for each object of the user session.

In accordance with another aspect of the invention, an article of manufacture is disclosed, comprising a program storage medium readable by a computer and embodying one or more instructions executable by the computer to perform a method for preparing a user session for expiration. An impending expiration of the user session is detected. An object graph corresponding to the user session is traversed to locate user session objects. For each object located in the traversing, allocated resources of the object are identified. For each identified allocated resource, said allocated resource is deallocated.

In accordance with yet another aspect of the invention, a system is disclosed. A software program is configured to initiate, process, and terminate user sessions. A resource deallocation module is linked to the software program to deallocate allocated external resources of each object of a user session responsive to an impending termination of said user session. An automatic memory management module is invoked subsequent to the deallocation performed by the resource deallocation module.

Numerous advantages and benefits of the invention will become apparent to those of ordinary skill in the art upon reading and understanding this specification.

BRIEF DESCRIPTION OF THE DRAWING

The invention may take form in various components and arrangements of components, and in various process operations and arrangements of process operations. The drawing is only for the purposes of illustrating preferred embodiments and is not to be construed as limiting the invention.

DETAILED DESCRIPTION OF THE PREFERRED EMBODIMENTS

Figure 1:
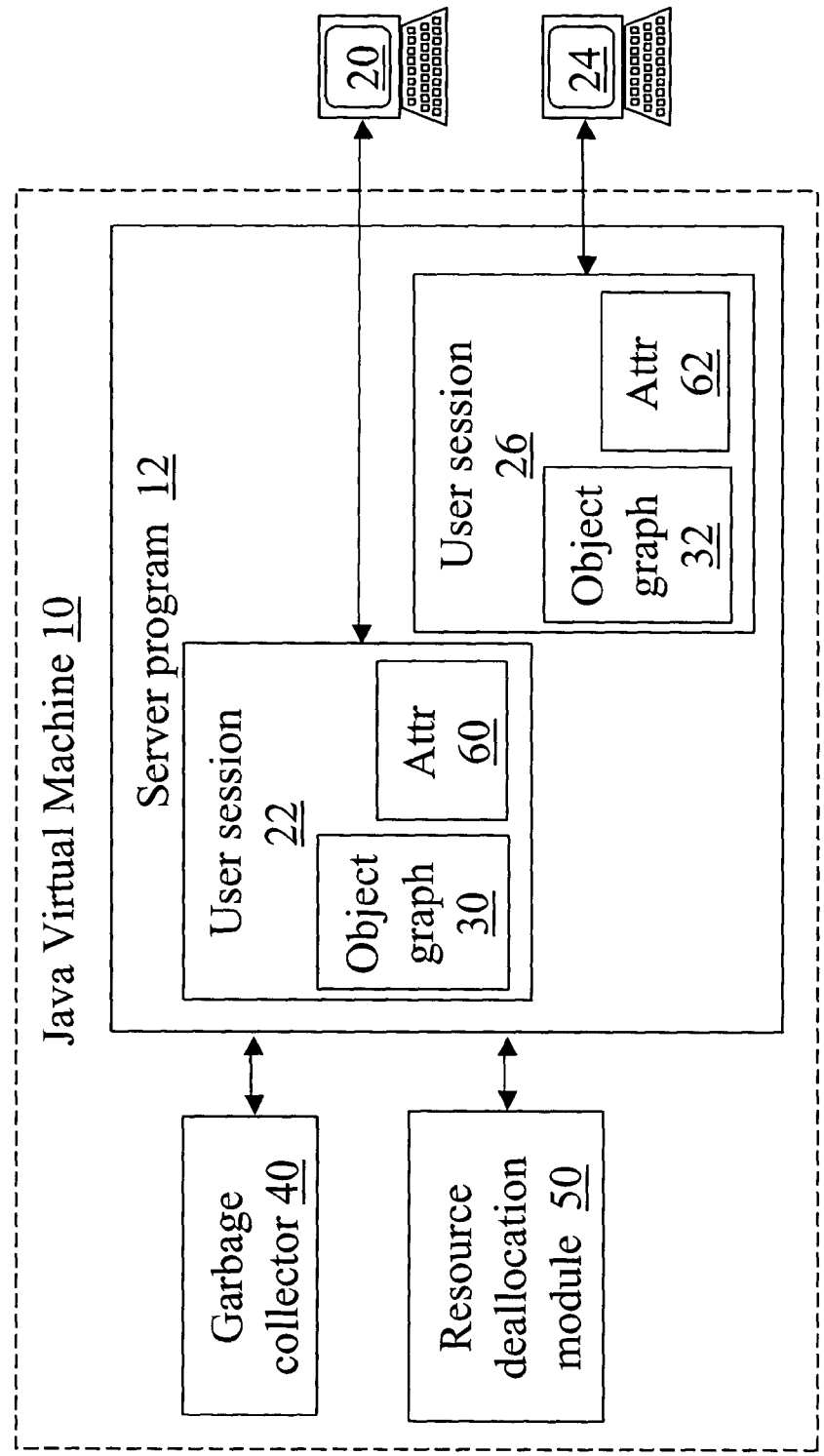
FIG. 1 shows a block diagram of a server application operating in a Java environment that includes an automatic memory management module and a resource deallocation module.

With reference to FIG. 1, a Java-based server executes within a Java virtual machine 10, which is indicated by a dashed box in FIG. 1. The Java virtual machine 10 executes Java programs in bytecode format. The Java virtual machine 10 is suitably a pure interpreter, a just-in-time compiler, or the like. The server is implemented as a server program 12 that is stored in bytecode format on a magnetic disk, optical disk, or other suitable digital data storage medium. Typically, the server program 12 or a selected portion thereof is loaded into random access memory (RAM) for execution by the Java virtual machine 10.

In the course of server operation, a first user 20 logs onto the server and a first user session 22 is created. Similarly, a second user 24 logs onto the server and a second user session 26 is created. Other users can similarly log onto the server, and a separate user session is created for each such user.

During execution of each user session 22, 26, the server program 12 typically creates user session objects that perform various tasks requested by the user 20, 24. These user session objects, in turn, may create additional user session objects that are referenced by the generating user session objects. Each user session 22, 26 preferably includes an object graph 30, 32 or other structure that keeps track of the objects of the corresponding user session 22, 26 and that keeps track of interrelationships or references between the session objects.

Moreover, the various user session objects may access system resources such as files, databases, other networked servers, and the like. When such system resources are accessed, the user session object creates external resource references such as file handles, database connections, sockets, threads, and the like, that are associated with or contained in the user session object.

Over time, certain user session objects which were created to perform certain tasks may have completed those tasks and no longer be needed. That is, once a given user session object completes the task for which it was created, that user session object is no longer needed. To free up memory occupied by user session objects that are no longer needed, an automatic memory management system is provided. Specifically, a garbage collector 40 executes one or more garbage collection algorithms with respect to one or more selected user sessions. The garbage collection algorithm or algorithms determine whether each user session object is still needed, and removes user session objects which are no longer needed.

In a typical approach, the garbage collector 40 examines the object graph 30, 32 of the user session being processed. User session objects which are not referenced by any other user session objects and which do not include references to external resources are deemed to be unneeded, and are removed. Typically, the garbage collector 40 is an integral part of the Java virtual machine 10 and is available to automatically manage memory usage of any Java program executing on the Java virtual machine 10. It is also contemplated, however, for the garbage collector 40 to be an add-on component respective to the Java virtual machine 10. For example, the garbage collector may be a Java program written specifically for managing memory of the server program 12.

The garbage collector 40 may fail to collect certain user session objects. For example, some user session objects created by the server program 12 may fail to properly dereference one or more system resource references after the user session object is finished accessing the corresponding system resource. Such obsolete references can include, for example, file handles, database connections, sockets, threads, or the like. These obsolete references are detected by the garbage collector 40 and misinterpreted as indicating that the user session object is still needed. Thus, the garbage collector 40 fails to collect the user session object. An example of such a potential problem is given by the following programming example:

```
File file = new File("sample.txt");
FileReader filerdr = new FileReader(file)
BufferedReader fr = new BufferedReader(filerdr);
session.putValue("filehandler", filerdr);
session.putValue("bufferfilehandler", fr);
.
.
.
{
    BufferedReader fr = (BufferedReader)
    session.getValue("bufferfilehandler");
    String finalstr = "";
    String str = "";
    while((str = fr.readLine( )) != null)
    {
        finalstr = finalstr + str;
    }
    // Nulling out the BufferedReader reference
    fr = null;
    filerdr = null;
} catch(IOException iox)
{
}
```

In typical Java implementations, merely nulling out the file reference fr and file reader stream reference filerdr does not deallocate the external file resource. In this case, the user session object containing the above portion of code retains obsolete references fr and filerdr which prevent the garbage collector 40 from removing the user session object and freeing the corresponding memory. Moreover, in addition to not collecting the user session object containing the above portion of code, the garbage collector 40 will also be unable to collect any user session objects referenced by the user session object containing the above portion of code.

These retained obsolete user session objects are memory leaks. That is, they represent portions of memory that are occupied by unused user session objects, and those portions of memory are therefore unavailable for other uses. It will be appreciated that these memory leaks are not typically a serious problem for a single user session. For example, a memory leak or even several memory leaks in the user session 22 are unlikely to grow sufficiently large to create a server failure by itself.

Server failure is typically caused by accumulation of memory leaks over time. As each user session is created, generates memory leaks, and then expires, it leaves behind obsolete user session objects that are not recovered by the garbage collector 40. Over time, the accumulated leakage of many such user sessions accumulates until a substantial amount of memory is occupied by such leaks. The reduced available memory can result in server slowdown, a server crash, or other detrimental server behavior.

When a user session is about to expire, the garbage collector 40 is invoked with respect to that user session. In the absence of memory leaks due to obsolete references, the invocation of the garbage collector 40 just prior to expiration of the user session results in all user session objects being collected (since no user session object should be needed at that point), so that when the user session expires the memory formerly occupied by that user session is freed up.

To address the problem of memory leaks due to obsolete references, a resource deallocation module 50 is executed prior to the garbage collection to deallocate any remaining allocated external resources of the about-to-expire user session. The resource deallocation module 50 accesses the object graph of the user session, traverses the object graph, dereferences user session objects by applying methods to remove references by a set of rules for a given user session object, and also deallocates any resources owned by the user session object by applying methods to release resources by a set of rules for a given object.

In a preferred embodiment for Java applications, the resource deallocation module 50 is implemented as a Listener method belonging to a Java MyListener class. The listener is registered with each user session, for example by assigning the Listener method to a session attribute 60, 62 using the following Java code snippet:

session.Attribute("Deallocator", instanceof.Listener)

which assigns an instance of the Listener embodying the resource deallocation module 50 to a session attribute 60, 62 identified as "Deallocator". In this way, just before the user session is about to expire and be destroyed, the session Listener instance is notified and operates to gracefully release resources held by user session objects of the about-to-expire user session.

A suitable method executed by the resource deallocation module 50 is set forth in the following programming example:

```
public void startReleaseResources( )
{
    // An enumeration of all the objects in the session is obtained
    String[ ] enum = session.getValueNames( );
    int size = enum.length;
    for(int i=0;i<size;i++)
    {
        String name = enum[i];
        // Retrieve an object from the session.
        Object obj = session.getValue(name);
        // Inspect the object type.
        // Different types have different dereferencing mechanisms.
            obj.releaseResources( );
    } //end-for
} // end-method
}
``` where the comments "// Inspect the object type" And "// Different types have different dereferencing mechanisms" are replaced by programming language implementation-specific and optionally object-specific code that identifies the object type and the release mechanism for references therein. For example, an identified file resource is properly released by closing the file resource (and not by merely nulling out the associated references). Other allocated resources such as database connections, sockets, threads, and the like are suitably deallocated using other specific deallocation mechanisms.

In the above programming example, string array "enum[ ]" is loaded with an enumeration of identifiers of objects of the user session. The "for{ }" loop employs integer index "i" to cycle through the user session objects identified by "enum[i]". For each object, the obj.releaseResources( ) method identifies and releases any remaining allocated resources of that user session object. The obj.releaseResources( ) method is optionally replaced by one or more suitable release methods tailored for a particular programming language, allocated resource, object, or other particulars.

After the resource deallocation module 50 has gone through the enumerated objects of the user session and completed the task of releasing any remaining references within each object, the garbage collector 40 is invoked to perform the usual garbage collection for the about-to-expire user session. Since any obsolete references of the user session objects have been removed by the resource deallocation module 50, the garbage collector 40 frees the user session objects without leaving memory leaks in the form of unfreed user session objects left over due to improper hanging references. Rather than invoking the garbage collector 40 responsive to an impending termination of a user session, the garbage collector 40 can be executed at the server program 12 level for multiple sessions. Still further, the garbage collector 40 can be executed at the level of the Java virtual machine 10 or at the operating system level for multiple server applications.

The Java server application described with reference to FIG. 1 is exemplary only. Those skilled in the art can readily adapt the described resource deallocation module 50 to other applications besides server applications. Moreover, the resource deallocation module 50 is readily employed in other programming environments that include automatic memory management, such as C#. Similarly to Java, C# executes intermediate language (IL) code and supports automatic garbage collection. Moreover, the resource deallocation module 50 is not limited to interpreter or just-in-time compiler environments such as Java and C# virtual machines that execute machine-independent code. The server program 12, garbage collector 40, and resource deallocation module 50 can be embodied as a fully compiled program or collection of programs created using Java, C#, or another compilable programming language and fully compiled into native machine code prior to execution.

Although the resource deallocation module 50 is shown as a separate module in FIG. 1, it is also contemplated to incorporate some or all of the functionality of the resource deallocation module 50 into the garbage collector 40 or into the server program 12. The resource deallocation module 50 can be an integral component of the java virtual machine 10 or can be an add-on utility program.

Still further, the functionality of the resource deallocation module 50 optionally is extended to address other issues that inhibit or prevent the garbage collector 40 from freeing all user session objects. For example, the resource deallocation module 50 optionally addresses certain configurations of circular object references that may be problematic for the garbage collector 40. The resource deallocation module 50 can address such object cycles, for example, by removing one or more object references from one or more of the objects of the cycle to break the reference circularity. With the problematic object cycle broken, the garbage collector 40 can readily collect the objects.

In the described augmented memory management method, the resource deallocation module 50 is preferably executed just prior to expiration of the user session but before the final garbage collection of that user session. In certain memory-intensive applications, however, it may be typical for the garbage collector to be invoked at other times besides just before user session expiration. For example, the garbage collector may be invoked whenever the free memory available for the application drops below a selected threshold. In such situations, the resource deallocation module 50 is readily modified to support such intermediate garbage collecting. For example, execution of the resource deallocation module can be triggered by an available free memory threshold that is above the aforementioned memory threshold for invoking the garbage collector. This ensures that resource deallocation is performed prior to the intermediate garbage collection. In the case of intermediate garbage collection performed while the user session in still in progress, some external references may still be active and should be retained. Hence, a less aggressive deallocation than the obj.releaseResources( ) method should be employed. For example, the substitute method optionally releases only null file references and other null external resource references, which are likely to have resulted from improper and failed release the resource by nulling rather than by using a deallocation method appropriate for deallocating that resource.

Still yet further, the resource deallocation method described herein is not limited to applications that employ multiple user sessions. For example, similar memory leak problems can arise on single-user personal computers, personal digital assistants, and other digital data processing systems in which various programs are opened, executed, and closed under an operating system such as Windows, PalmOS, MacOS, UNIX, LINUX, or the like. If the operating system employs an automatic memory management system, the resource deallocation module 50 described herein is readily adapted to augment the automatic memory management system to prevent accumulation of obsolete objects left over after various application programs are closed. In this adaptation of the resource deallocation module 50, the various user application programs correspond to user sessions 22, 26, and the operating system corresponds to the server program 12.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method in a resource deallocation module of releasing resources of a user session operating in a software environment that includes an automatic memory management algorithm executed by a garbage collector, the method comprising:
   using the resource deallocation module, detecting an impending execution of the automatic memory management algorithm by the garbage collector for removing user session objects created for the user session that are not referenced by a remaining object and which do not reference one or more external resources;
   responsive to the detecting and prior to executing the automatic memory management algorithm by the garbage collector, removing any obsolete references of the user session objects by:
      accessing, by the resource deallocation module, a first user session object of said user session objects of the user session and traversing an object graph;
      identifying, by the resource deallocation module, one or more obsolete external resource references of said first user session object, wherein said one or more obsolete external resource references have not been released by said first user session object;
      using the resource deallocation module, releasing said one or more obsolete external resource references by a set of rules for said first user session object; and
      repeating the accessing, identifying, and releasing, by the resource deallocation module, for each user session object of said user session objects of the user session, thereby removing any obsolete references of the user session objects prior to invoking said automatic memory management algorithm for removing said user session objects created for said user session that are not referenced by a remaining object and which do not reference one or more external resources.

2. The method as set forth in claim 1, further including:
performing the accessing, identifying, releasing, and repeating as a Listener method belonging to a Java MyListener class in a Java environment; and
registering the Listener method with the user session.

3. The method as set forth in claim 2, wherein the registering includes:
setting a session attribute to correspond to an instance of the Listener method.

4. The method as set forth in claim 2, wherein the detecting includes:
notifying the registered Listener method of the impending expiration of the user session.

5. The method as set forth in claim 1, wherein the detecting includes:
detecting an impending expiration of the user session.

6. The method as set forth in claim 1, further including executing the automatic memory management algorithm by said garbage collector after removing said obsolete references of said user session objects by the resource deallocation module to remove said user session objects created for said user session.

7. The method as set forth in claim 1, wherein:
the identifying includes identifying a file resource; and
the releasing includes closing said file resource.

8. The method as set forth in claim 1, wherein:
the identifying includes identifying an allocated resource; and
the releasing includes deallocating the allocated resource.

9. The method as set forth in claim 1, wherein the accessing of said first user session object of the user session includes:
obtaining an object identifier corresponding to said first user session object from the object graph; and
retrieving said first user session object using the object identifier.

10. The method as set forth in claim 1, further including:
identifying said first user session object of the user session; and,
determining an object type of said first user session object.

11. The method as set forth in claim 10 wherein said releasing includes releasing said one or more external resource references by a set of rules for said first user session object, including rules based on said object type.

12. The method as set forth in claim 1, wherein said one or more external resource references are associated with at least one of file handles, database connections, sockets, and threads.

13. A system comprising:
a database including:
   a software program configured to initiate, process, and terminate user sessions;
   an object graph defining an interrelationship between objects of said user session;
   a resource deallocation module linked to the software program and responsive to an impending termination of said user session to deallocate obsolete allocated external resources of each object of one or more objects created for a user session, wherein said obsolete allocated external resources have not been released by said object so that said one or more objects created for the user session are not referenced by a remaining of said one or more objects and which do not reference one or more of the allocated resources; and
   an automatic memory management garbage collector module invoked subsequent to a completion of the deallocation performed by the resource deallocation module, the automatic memory management garbage collector module for removing each of said one or more objects which is not referenced by a remaining of said one or more objects and which does not reference one or more of said allocated external resources.

14. The system as set forth in claim 13, further including:
a Java virtual machine implementing the software program, the resource deallocation module, and the automatic memory management module.

15. The system as set forth in claim 13, wherein the resource deallocation module includes:
a deallocation listener method adapted to deallocate the allocated external resources of each object of said user session responsive to a notification of the impending termination of said user session.

16. The system as set forth in claim 15, wherein the resource deallocation module is linked to the software program by registration of the deallocation listener method with said user session.

17. The system as set forth in claim 15, wherein the resource deallocation module is linked to the software program by an assignment of an attribute of said user session to the deallocation listener method.

18. The system as set forth in claim 13, wherein the resource deallocation module is adapted to access the object graph to identify the objects of the user session.

19. The system as set forth in claim 13, wherein the automatic memory management module is invoked by the software program to process a plurality of user sessions including said user session.

20. The system as set forth in claim 13, wherein the automatic memory management module is invoked by an operating system to process software including said software program that operate under said operating system.

21. The system as set forth in claim 13, wherein the resource deallocation module is integrated with the automatic memory management module as a single unitary memory management unit that executes prior to the termination of said user session.

22. An article of manufacture comprising a program storage medium readable by a computer and embodying one or more instructions of a resource allocation module executable by the computer to perform a method of releasing resources of a user session operating in a software environment that includes an automatic memory management algorithm executed by a garbage collector, the method comprising:
   using the resource deallocation module, detecting an impending execution of the automatic memory management algorithm by the garbage collector for removing at least one user session object created for the user session that is not referenced by a remaining object and which does not reference one or more external resources;
   responsive to the detecting and prior to executing the automatic memory management algorithm by the garbage collector, removing any obsolete references of the user session objects by:
      accessing, by the resource deallocation module, a first user session object of said user session objects of the user session and traversing an object graph;
      identifying, by the resource deallocation module, one or more obsolete external resource references of said first user session object, wherein said one or more obsolete external resource references have not been released by said first user session object;
      using the resource deallocation module, releasing said one or more obsolete external resource references by a set of rules for said first user session object; and
      repeating the accessing, identifying, and releasing, by the resource deallocation module, for each user session object of the user session objects of the user session, thereby removing any obsolete references of the user session objects prior to invoking said automatic memory management algorithm for removing said at least one first session object created for said user session that is not referenced by a remaining object and which does not reference one of more external resources.

23. The article of manufacture as set forth in claim 22, wherein the method further includes:
   performing the accessing, identifying, releasing, and repeating as a Listener method belonging to a Java MyListener class in a Java environment; and
   registering the Listener method with the user session.

24. The article of manufacture as set forth in claim 23, wherein the registering includes:
   setting a session attribute to correspond to an instance of the Listener method.

25. The article of manufacture as set forth in claim 23, wherein the detecting includes:
   notifying the registered Listener method of the impending expiration of the user session.

26. The article of manufacture as set forth in claim 22, wherein the detecting includes:
   detecting an impending expiration of the user session.

27. The article of manufacture as set forth in claim 22, wherein the method further includes executing the automatic memory management algorithm by said garbage collector after a completion of said repeating to remove said at least one first session object created for said user session.

28. The article of manufacture as set forth in claim 22, wherein:
   the identifying includes identifying a file resource; and
   the releasing includes closing said file resource.

29. The article of manufacture as set forth in claim 24, wherein:
   the identifying includes identifying an allocated resource; and
   the releasing includes deallocating the allocated resource.

30. The article of manufacture as set forth in claim 22, wherein the accessing of said first user session object of said user session objects of the user session includes:
   obtaining an object identifier corresponding to said first user session object from the object graph; and
   retrieving said first user session object using the object identifier.

31. A method in a resource deallocation module of releasing resources of a user session operating in a software environment that includes an automatic memory management algorithm executed by a garbage collector, the method comprising:
   using the resource deallocation module, detecting an impending execution of the automatic memory management algorithm by the garbage collector for removing at least one user session object of user session objects created for the user session that is not referenced by a remaining object and which does not reference one or more external resources;
   responsive to the detecting and prior to executing the automatic memory management algorithm by the garbage collector, removing any obsolete references of the user session objects by:
      accessing, by the resource deallocation module, a first user session object of the user session objects of the user session;
      identifying, by the resource deallocation module, one or more obsolete external resource references of said first user session object, wherein said one or more obsolete external resource references have not been released by said first user session object;
      using the resource deallocation module, releasing said one or more obsolete external resource references by a set of rules for said first user session object; and
      repeating the accessing, identifying, and releasing, by the resource deallocation module, for each of the user session objects of the user session, thereby removing any obsolete references of the user session objects prior to invoking said automatic memory management algorithm for removing said at least one user session object of the user session objects created for the user session.

32. The method as set forth in claim 31, further including:
   identifying said first user session object of the user session and, determining an object type of said first user session object; and, executing the automatic memory management algorithm by said garbage collector to remove said at least one first user session object of the user session objects created for said user session.

33. The method as set forth in claim 32 wherein said releasing includes releasing said one or more external resource references by a set of rules for said first user session object, including rules based on said object type.

34. A system comprising:
a database including:
 a software program stored in the system and configured to initiate, process, and terminate user sessions;
 a resource deallocation module linked to the software program, the resource deallocation module deallocating one or more obsolete allocated external resources of one or more user objects of a user session responsive to an impending termination of said user session, wherein said one or more obsolete allocated external resources have not been released by said one or more user objects; and
 an automatic memory management garbage collector module invoked subsequent to a completion of the deallocating performed by the resource deallocation module, the automatic memory management garbage collector removing each of said one or more user objects which is not referenced by remaining ones of said one or more objects and which does not reference said one or more obsolete allocated external resources.

35. An article of manufacture comprising a program storage medium readable by a computer and embodying one or more instructions of a resource allocation module executable by the computer to perform a method of releasing resources of a user session operating in a software environment that includes an automatic memory management algorithm executed by a garbage collector, the method comprising:
 using the resource deallocation module, detecting an impending execution of the automatic memory management algorithm by the garbage collector for removing a session object of session objects created for the user session, and which does not reference one or more external resources;
 responsive to the detecting and prior to executing the automatic memory management algorithm by the garbage collector, removing any obsolete references of session objects created for the user session by:
  accessing, by the resource deallocation module, a first session object of the user session;
 identifying, by the resource deallocation module, one or more obsolete external resource references of said first session object, wherein said one or more obsolete external resource references have not been released by said first session object;
  using the resource deallocation module, releasing said one or more obsolete external resource references by a set of rules for said first session object; and
  repeating the accessing, identifying, and releasing, by the resource deallocation module, for each session object of the user session, thereby removing any obsolete references of session objects created for the user session; and
 after said removing of said obsolete references, invoking said automatic memory management algorithm for removing said session object created for said user session that is not referenced by a remaining object and which does not reference one or more external resources.

36. The article of manufacture as set forth in claim 35, wherein the method further includes:
 identifying said session object of the user session; and,
 determining an object type of said session object; and,
 after a completion of said repeating by said resource deallocation module, executing the automatic memory management algorithm by the garbage collector to remove said session objects created for the user session.

37. The article of manufacture as set forth in claim 36, wherein the method further includes releasing said one or more external resource references by a set of rules for said session object of said user session, including rules based on said object type.

* * * * *